Patented Mar. 21, 1950

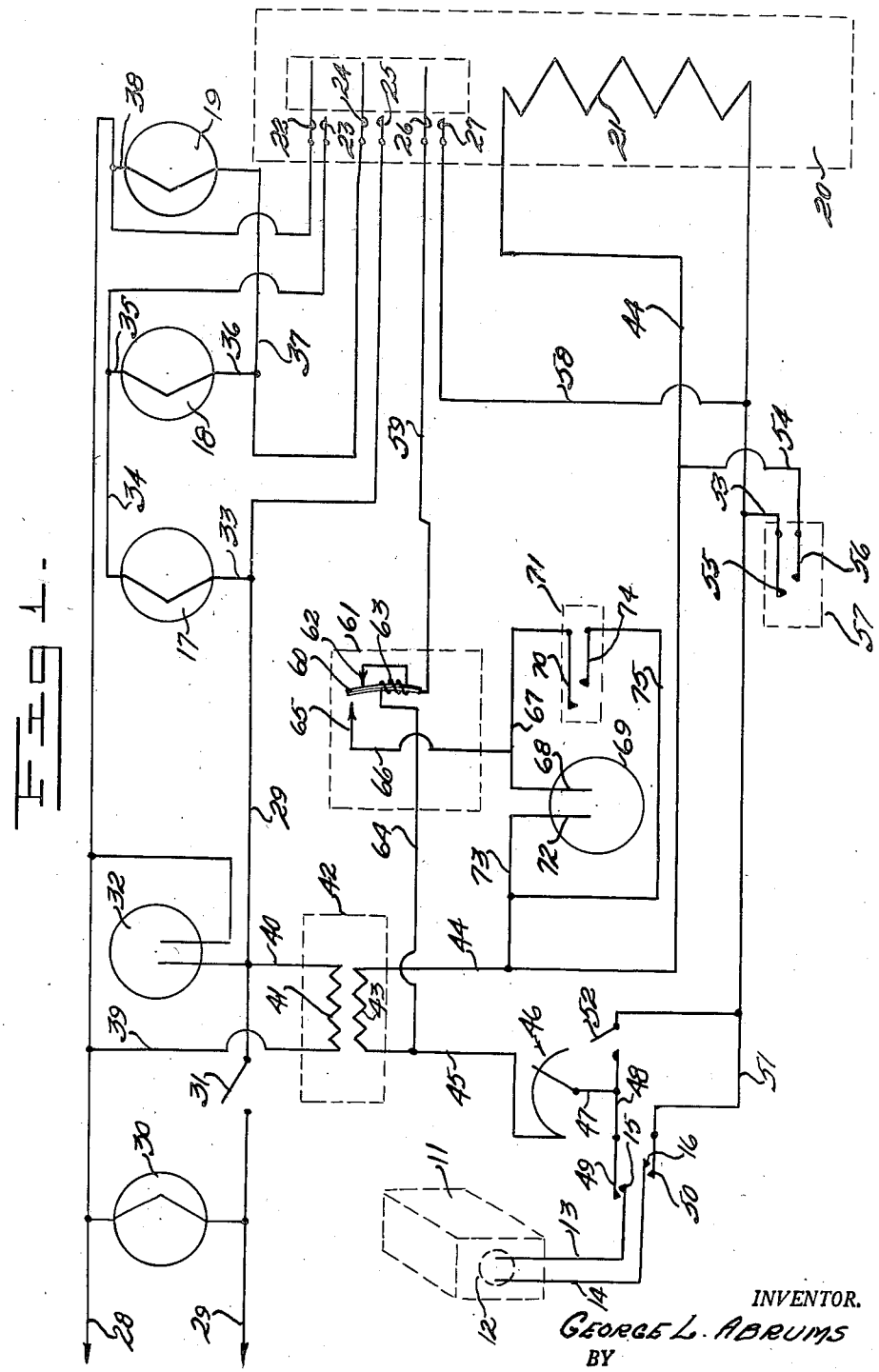

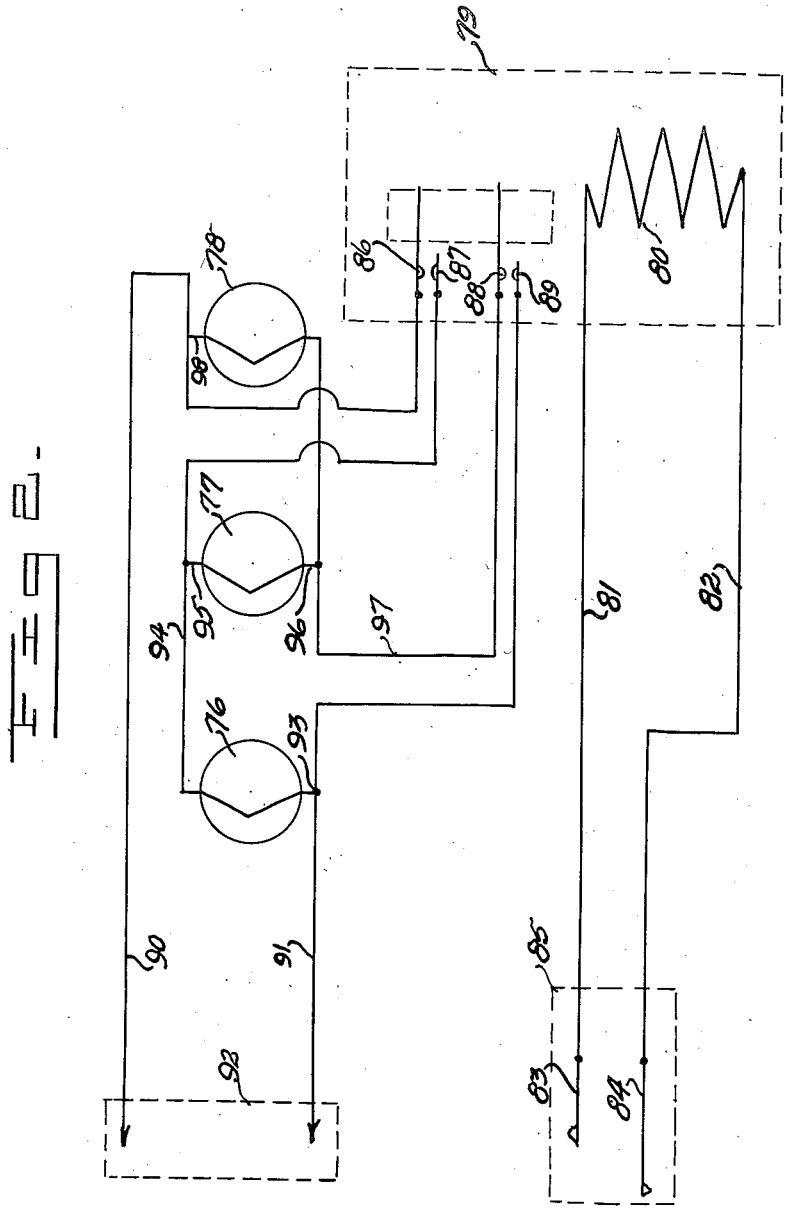

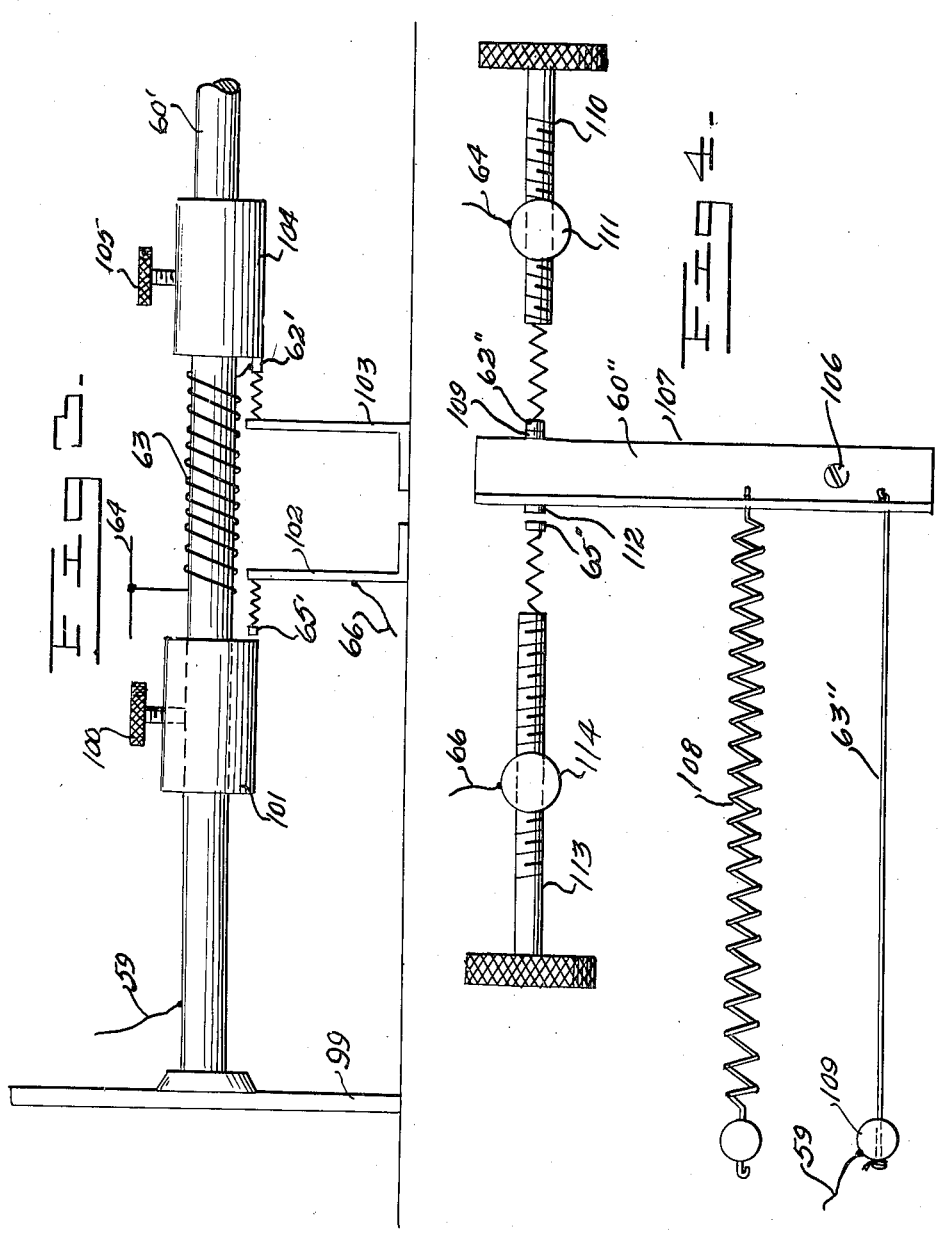

2,501,017

UNITED STATES PATENT OFFICE 2,501,017

PHOTOGRAPHIC LIGHT CONTROL DEVICE

George L. Abrums, Jacksonville, Fla.

Application March 14, 1947, Serial No. 734,797

2 Claims. (Cl. 315—191)

This invention relates to control devices for photographic illumination sources and more particularly to a device for synchronizing the operation of a plurality of flashlight or floodlight lamps with the operation of a camera shutter.

A main object of the invention is to provide a novel and improved control system for controlling a plurality of "photoflood" lamps or the like, either alone or in combination with a plurality of "photoflash" lamps or the like, synchronously with the opening of one or more camera shutters for obtaining a photographic exposure, said system being simple in structure, easy to operate and reliable in performance.

A further object of the invention is to provide an improved electrical control system for the sources of illumination in photography, the system providing synchronization of peak intensity of all the lamps in the illumination source with the opening of the camera shutters, despite the fact that some lamps would reach peak intensity ahead of other lamps in the source if all the lamps were simultaneously energized, the system functioning to retard the energization of the former lamps so that all the lamps reach peak intensity at the same instant, said instant being that at which the camera shutter is opened.

Further objects and advantages of the invention will become apparent from the following description and claims, and from the accompanying drawings, wherein:

Figure 1 is a schematic wiring diagram illustrating the electrical layout of a lamp control system for photography constructed in accordance with the present invention.

Figure 2 is a schematic wiring diagram of an auxiliary lamp control unit employed with the system of Figure 1.

Figure 3 is an elevational view of a thermal switch adapted to be employed in the control system of Figure 1.

Figure 4 is a top plan view of an alternative embodiment of a thermal switch adapted to be employed in the control system of Figure 1.

Referring to the drawings, and more particularly to Figure 1, 11 designates a camera having a conventional shutter switch 12 actuated by the opening of the shutter to close the switch contacts. The shutter mechanism has conventional means, not shown, to close the switch contacts momentarily a fraction of a second before the shutter is opened. Said contacts are normally open. The shutter switch 12 is provided with lead wires 13 and 14 connected to a male plug having respective plug terminals 15 and 16.

The illumination apparatus comprises a bank of "photoflood" lamps, or the like, shown at 17, 18, and 19, normally connected in series, and arranged to be connected in parallel by the energization of a relay 20. Relay 20 has a solenoid winding 21 and three sets of normally open contact pairs shown respectively at 22, 23, 24, 25, and 26, 27, which are simultaneously closed when the solenoid winding is energized.

The alternating current line wires are shown at 28 and 29, and connected across said wires, is a pilot lamp 30. Line wire 29 includes a control switch 31, which is located beyond the connection to pilot lamp 30 so as not to affect said pilot lamp. Connected across said line wires beyond switch 31 is a female receptacle or socket 32. One terminal of lamp 17 is connected to line wire 29 by a wire 33. The other terminal of lamp 17 is connected by a wire 34 to contact 23 of the relay 20. One terminal of lamp 18 is connected by a wire 35 to wire 34 and the other terminal is connected by a wire 36 to a wire 37, leading to contact 24 of the relay. Line wire 29 is connected to contact 25 of the relay. Line wire 28 is connected to contact 22 of the relay. One terminal of lamp 19 is connected by a wire 38 to line wire 28 and the other terminal thereof is connected to wire 37.

It will be seen from Figure 1 that when switch 31 is closed lamps 17, 18 and 19 will be energized in series from the line wires 28 and 29 and will glow at low brilliance. However, when the contact pairs 22, 23 and 24, 25 are closed the lamps will be energized in parallel and will be at maximum brilliance.

Connected across line wires 28 and 29 beyond the switch 31 by wires 39 and 40 is the primary 41 of a step-down transformer 42. One terminal of the secondary 43 of the transformer is connected by a wire 44 to a terminal of the solenoid winding 21. The other terminal of the secondary is connected by a wire 45 to one terminal of a rheostat 46. The other terminal of the rheostat is connected by a wire 47 to a wire 48. Connected to wire 48 is a female jack terminal 49 adapted to make contact with the male plug terminal 15. The second female jack terminal 50 is adapted to make contact with male plug terminal 16, and is connected by a wire 51 to the remaining terminal of solenoid winding 21. Connected across the wires 48 and 51 is a shorting switch 52 adapted at times to shunt the female jack terminals 49 and 50.

Connected to wires 44 and 51 by respective wires 53 and 54 are the female contacts 55 and 56 of a second female jack 57 whose purpose will be presently described.

A wire 58 connects wire 51 to relay contact 27. Connected to relay contact 26 by a wire 59 is the bimetallic electrically conducting contact arm 60 of a thermal switch 61. Normally engaging arm 60 is a stationary contact 62 connected through a heater winding 63 wound around but insulated from arm 60 to a wire 64 which is connected to wire 45. Thermal switch 61 has another stationary contact 65 adapted to be engaged by contact arm 60 as the arm flexes due to heating thereof. The arrangement is such that stationary contact 62 will remain in contact with arm 60 for a short period of time after arm 60 engages the second stationary contact 65.

Contact 65 is connected by a wire 66 to a wire 67. One end of wire 67 is connected to one terminal 68 of a female receptacle or socket 69. The other end of wire 67 is connected to a female contact 70 of a female jack 71. The other terminal 72 of socket 69 is connected by a wire 73 to wire 44. The other terminal 74 of jack 71 is connected by a wire 75 to wire 73.

In operation of the system shown in Figure 1, when switch 12 of the camera shutter mechanism is momentarily closed, an energizing circuit for solenoid winding 21 is momentarily established comprising wire 44, connected to one terminal of transformer, secondary 43, solenoid winding 21, wire 51, jack contact 50, plug contact 16, wire 14, switch 12, wire 13, plug contact 15, jack contact 49, wire 48, wire 47, rheostat 46, and wire 45. This connects the lamps in parallel as above explained by closing the contact pairs 22, 23 and 24, 25. Contacts 26 and 27 also close and establish a holding circuit for the solenoid winding 21 comprising wire 64 connected to wire 45 at the transformer secondary, heater winding 63, stationary contact 62, bimetal arm 60, wire 59, contacts 26 and 27, wire 58, solenoid winding 21 and wire 44 connected to the other transformer secondary terminal. After a short time period, during which the camera shutter is open and the lamps 17, 18 and 19 are operating at full brilliancy to make the photographic exposure, bimetal arm 60 flexes away from contact 62 and thereby breaks the holding circuit for solenoid winding 21. The relay thereupon becomes deenergized and the three sets of contacts thereof open, causing the lamps 17, 18 and 19 to return to their original series connection.

The above-described cycle of operation is employed where lamps 17, 18 and 19 are of the "photoflood" or similar type, and the timing of switch 12 with respect to the camera shutter is adjusted so that the lamps may reach their peak brilliancy just before the shutter is opened wide. It is frequently desirable to employ auxiliary "photoflood" lamps. For this purpose an auxiliary unit such as is shown in Figure 2 is employed with the main apparatus of Figure 1. The auxiliary unit comprises "photoflood" lamps 76, 77, and 78, normally connected in series and arranged to be connected in parallel by a relay 79. Relay 79 has a solenoid winding 80 whose terminals are connected by respective wires 81 and 82 to the respective male plug terminals 83 and 84 of a male jack plug 85. Relay 79 has two sets of contacts, shown at 86, 87 and 88, 89, said contacts being normally open and being closed responsive to energization of solenoid winding 80. Line wires 90 and 91 are provided, said wires terminating in a male plug 92. One terminal of lamp 76 is connected by a wire 93 to wire 91 and the other terminal of the lamp is connected by a wire 94 to relay contact 87. Line wire 91 is connected to relay contact 89. One terminal of lamp 77 is connected by a wire 95 to wire 94 and the other terminal of the lamp is connected by a wire 96 to a wire 97 connected to relay terminal 88. One terminal of lamp 78 is connected by a wire 98 to line wire 90 which in turn is connected to relay terminal 86. The other terminal of lamp 78 is connected to wire 97.

It will be seen that the lamps 76, 77 and 78 are normally connected in series with the line wires 90 and 91, but are connected in parallel with said line wires when contacts 86, 87, and 88, 89 close responsive to energization of solenoid winding 80.

Plug 92 is plugged into receptacle 32 and plug 85 is plugged into jack 57 of the main unit, whereby lamps 76, 77, and 78 function in the same manner as lamps 17, 18 and 19, and solenoid 80 is connected in parallel with and is identically controlled with the main relay winding 21. By the use of multiple outlet connecting adapters at receptacle 32 and at jack 57, any reasonable number of auxiliary units in parallel connection with each other and each controlling a bank of "photoflood" lamps may be used.

It is frequently desirable to employ auxiliary lamps such as those of the "photoflash" type which reach peak brilliancy faster than the "photoflood" type after energization thereof. If "photoflash" lamps are used, they are connected in any reasonable number through multiple outlet connecting adapters, in parallel connection with one another, at receptacle 69 of the basic unit. When the shutter switch 12 is momentarily closed, as above described, the heater winding 63 becomes energized in series with the main solenoid winding 21 and the bimetal arm 60 flexes. When the lamps 17, 18 and 19 are close to peak brilliancy arm 60 engages stationary contact 65, thereby energizing the "photoflash" lamps through a circuit comprising wire 64, heater winding 63, contact 62, arm 60, contact 65, wire 66, wire 67, the parallel "photoflash" lamp circuits connected to socket 69, wire 73 and wire 44 to the transformer secondary 43. The "photoflash" lamps flash almost immediately to peak brilliancy, synchronizing with the peak brilliancy of lamps 17, 18 and 19.

After a short time period, during which the camera shutter is open and the photographic exposure is being made, arm 60 flexes out of contact with stationary contact 62, which opens the energizing circuit for the "photoflash" lamps and breaks the holding circuit for main solenoid winding 21. This opens contacts 26 and 27, de-energizing the heater winding 63.

It will thus be seen that the thermal switch 61 provides a time delay subsequent to the parallel energization of the "photoflood" lamps 17, 18 and 19 before the "photoflash" lamps become energized, to provide synchronization of the peak intensities of the two sets of lamps.

Jack 71 is employed to control the shutters of a plurality of other cameras when it is desired to use more than one camera to photograph the subject. The other cameras are provided with conventional solenoid-and-plunger means for controlling the operation of their shutters, and the solenoid windings thereof are connected in parallel to a suitable male jack plug which is plugged into jack 71. Therefore, when arm 60 flexes into contact with stationary contact 65, as above described, an energizing circuit similar to that described in connection with the use of "photoflash" lamps is completed and operates the camera shutters, synchronizing their opening with the attainment of peak intensity of the illumination means employed.

Switch 52 is used in conjunction with rheostat 46 for making preliminary adjustments of the relay contacts of relay device 20 where it is desired to obtain the same resistance in the solenoid winding circuit as is present when the shutter switch 12 is closed. By closing switch 52 and substituting a portion of the resistance of rheostat 46, the actual working resistance of the shutter switch circuit may be simulated for purposes of adjusting the relay contacts.

Figure 3 illustrates a form of thermal switch which may be employed at 61 in the arrangement of Figure 1. A metal electrically conducting rod 60' having a substantial temperature coefficient of expansion, is rigidly mounted on a suitable stationary support 99. The heater winding 63 is wound around the rod 60'. Secured to rod 60' by a set screw 100 is an adjustable collar 101 adapted to be engaged by a contact element 65' resiliently mounted on a bracket member 102. Wire 66 is connected to bracket 102. Adjacent to bracket 102 and insulated therefrom is a second bracket 103 on which is resiliently mounted a contact element 62'. Engaging contact element 62' is an adjustable collar 104 secured to rod 60' by a set screw 105. Wire 59 is connected to rod 60'. One end of heater winding 63 is connected to wire 64 and the other end thereof is connected to contact element 62'. Winding 63 is electrically insulated from rod 60'. Contact element 62' is normally in engagement with collar 104 and contact element 65' is normally out of engagement with collar 101. When winding 63 becomes energized the rod 60' expands, causing collar 101 to engage contact element 65' after a short time period, contact element 62' remaining in engagement with collar 104 until another time period has elapsed, following which collar 104 moves out of engagement with contact element 62' whereupon the heater winding and the lamp relays become deenergized, as explained above.

The thermal switch of Figure 3 may be operated without a heater coil by constructing rod 60' of a material having considerable electrical resistance and a high coefficient of expansion. Wire 64 is then connected directly to contact 62'. The current then passes from contact 62' to collar 104, and through rod 60' to wire 59. The passage of this electrical current through rod 60' then heats and consequently expands it directly.

Another form of thermal switch which may be employed at 61 in Figure 1 is illustrated in Figure 4. Pivotally connected at 106 to a suitable support is an electrically conducting lever arm 107 biased in a counterclockwise direction by a spring 108. Counterbalancing spring 108 is a length of resistance wire 63" having a substantial temperature coefficient of expansion, wire 63" being connected at one end to a stationary terminal 199 and at the other end to the end portion of arm 107, whereby spring 108 maintains wire 63" in tension. When current passes through wire 63" it expands in length allowing spring 108 to rotate arm 107 counterclockwise. Arm 107 carries at its free end a first contact 109 which is normally engaged by a contact element 62" resiliently mounted on a set screw 110 adjustably threaded through a stationary terminal 111. Wire 64 is connected to terminal 111. Opposite contact 109 arm 107 carries a second contact 112 adapted to be engaged, upon counterclockwise rotation of arm 107, with a contact element 65" resiliently mounted on a set screw 113 adjustably threaded through a stationary terminal 114. Wire 66 is connected to terminal 114. Wire 59 is connected to terminal 109.

When the holding circuit for solenoid winding 21 becomes established, wire 63" is included in the current path between wires 59 and 64, causing wire 63" to expand. After a short time period, during which contact element 62" remains in engagement with contact 109, contact 112 engages contact element 65" establishing the circuit for the "photoflash" lamps. After another short time period wherein the two sets of lamps are operating at peak brilliancy and the photographic exposure is being made, contact 109 moves out of engagement with contact element 62", breaking the energizing circuits for the lamp relays and interrupting the current flow through wire 63".

By the use of the control devices above described, the process of posing a subject for photography is greatly facilitated inasmuch as the subject can be posed, the lights properly arranged and camera adjustments made while the "photoflood" lamp or similar lamps are producing illumination by subdued intensity in their series arrangement. During this interval, therefore, the subject is not exposed to the intense heat and light of such lamps producing their maximum illumination. When the camera shutter is tripped to expose the film, the flood lamps automatically produce their full illumination for the exposure of the picture. The exposure is thus made before the subject has time to unfavorably react to the sudden maximum illumination.

Since the lamps automatically revert to their condition of subdued illumination within a short time period, the subject is only exposed to maximum heat and light for a short time. The lamps are operated at maximum intensity for only short periods of time thereby extending their useful life. This economic advantage is further enhanced by the fact that the lamps are initially energized at low intensity and when they are connected from series to parallel arrangement for full brilliancy, thermal and electrical shock to the filaments is minimized.

Further advantages result from the fact that when the lamps are producing illumination of low intensity before the camera exposure is made, the various shadows and highlights bear the same relation to each other as when the lamps produce maximum illumination. Thus the photographer may arrange the lights to suit his taste with full confidence that the effects he achieves with the lights at a low intensity will be the same as recorded on the film at high illumination intensity.

Further advantages result from the ability of the device to synchronize and control a plurality of "photoflood" lamps either independently or in conjunction with "photoflash" lamps, or vice versa. The device may be readily employed with a plurality of cameras which may be of different types and which may contain different types of sensitive photographic material, and which may be used to obtain photographs from different points of view at the same time.

While certain specific embodiments of illumination control devices for photography have been disclosed in the foregoing description, it will be understood that various modifications within the

What is claimed is:

1. In an illuminating system of the character described a pair of control leads, a pair of power leads from an alternating current source, a plurality of flood lamps, a transformer having two primary leads connected to said power leads and one of a pair of secondary leads connected to one of the control leads, a relay having a plurality of pairs of contacts and a solenoid also connected by one of a pair of leads to the other of said control leads and connected through the remaining lead of said last-named pair with the other secondary lead of the transformer, a conductor connecting one contact of one pair of the relay contacts with one lead of the solenoid, a second conductor connecting at one end with the other contact of the latter pair of relay contacts and at the other end terminating in a bimetallic switch contact member, a heater coil terminating at one end in a holding circuit contact adjacent to said bimetallic switch contact member, a further conductor connected at one end to the other end of the heater coil and at the other end of the latter conductor to the first-mentioned secondary lead of the transformer, a lead interconnecting one of a second pair of relay contacts with one pole of one of the flood lamps and one of the power leads, another lead interconnecting the second contact of said second pair with one pole each of a second and a third flood lamp, a lead connecting the other pole of the third flood lamp with the other power lead and with one of a third pair of relay contacts, and a lead interconnecting the second of said third pair of relay contacts with the other pole of the first-mentioned flood lamp and the second flood lamp, and switch means for controlling said power leads.

2. In an illuminating system of the character described adapted for use with a camera shutter-control switch, a pair of control leads, a pair of power leads from an alternating current source and a plurality of flood lamps, a transformer having two primary leads connected to said power leads and one of a pair of secondary leads connected to one of the control leads, a relay having a plurality of pairs of contacts and a solenoid also connected by one of a pair of leads to the other of said control leads and connected through the other lead of said last-named pair with the other secondary lead of the transformer, a conductor connecting one contact of one pair of the relay contacts with one lead of the solenoid, a second conductor connecting at one end with the other contact of the latter pair of relay contacts and at the other end terminating in a bimetallic switch contact member, a heater coil terminating at one end in a holding circuit contact adjacent to said bimetallic switch contact member, a further conductor connected at one end to the other end of the heater coil and at the other end of the latter conductor to the first-mentioned secondary lead of the transformer, a lead interconnecting one of a second pair of relay contacts with one pole of one of the flood lamps and one of the power leads, another lead interconnecting the second contact of said second pair with one pole each of a second and a third flood lamp, a lead connecting the other pole of the third flood lamp with the other power lead and with one of a third pair of relay contacts, and a lead interconnecting the second of said third pair of relay contacts with the other pole of the first-mentioned flood lamp and the second flood lamp, switch means for controlling said power leads, an auxiliary illuminating system, means for connecting said auxiliary system with the first-mentioned photographic illuminating system, said last-named means including a jack associated with the latter system having two contacts individually connected to the leads of the relay solenoid and a pair of socket contacts connected to the power leads, and said auxiliary illuminating system including a pair of auxiliary power leads terminating at one end in a plug adapted to be brought into contact with the socket contacts, a plurality of auxiliary flood lamps, an auxiliary relay having two pairs of relay contacts and a second solenoid for operating them and having two leads terminating in two contacts forming a jack plug adapted to be plugged into said jack to connect the second solenoid in parallel with the first-mentioned solenoid, a conductor interconnecting one auxiliary power lead and one pole of one auxiliary flood lamp with one contact of one pair of relay contacts of said second solenoid, another conductor interconnecting one pole each of a second and a third flood lamp of said auxiliary flood lamps and the other contact of said last-named pair of relay contacts, a further conductor interconnecting the other pole of each of the one auxiliary flood lamp and the second flood lamp with one contact of the other pair of relay contacts of said second solenoid, and a conductor interconnecting the other contact of the latter pair of relay contacts with the other pole of the third auxiliary flood lamp and the other auxiliary power lead.

GEORGE L. ABRUMS.

REFERENCES CITED

The following references are of record in the file of this patent:

UNITED STATES PATENTS

| Number | Name | Date |
|---|---|---|
| 1,088,695 | Goldensky et al. | Mar. 3, 1914 |
| 1,295,342 | Markley | Feb. 25, 1919 |
| 1,319,962 | Markley | Oct. 28, 1919 |
| 1,348,746 | Schepeler | Aug. 3, 1920 |
| 1,985,097 | Kearsley | Dec. 18, 1934 |
| 1,988,022 | Smith | Jan. 15, 1935 |
| 2,258,140 | Kaletay | Oct. 7, 1941 |
| 2,261,953 | Brown | Nov. 11, 1941 |
| 2,314,829 | Hunter | Mar. 23, 1943 |